United States Patent

Schmidt et al.

[11] Patent Number: 5,773,623
[45] Date of Patent: Jun. 30, 1998

[54] METHINE DYES CONTAINING A 5- OR 6-MEMBERED CARBOCYCLIC OR HETEROCYCLIC RADICAL

[75] Inventors: Andreas Johann Schmidt, Freinsheim; Rüdiger Sens, Mannheim, both of Germany

[73] Assignee: BASF Aktiengesellschaft, Ludwigshafen, Germany

[21] Appl. No.: 624,332

[22] Filed: Mar. 29, 1996

[30] Foreign Application Priority Data

Apr. 3, 1995 [DE] Germany .............................. 19512398.0

[51] Int. Cl.$^6$ ...................... C07D 213/74; C07D 413/12; B41M 5/035; B41M 5/26

[52] U.S. Cl. ............................... 546/278.4; 8/467; 8/471; 546/278.7; 546/290.7; 546/292; 428/914; 428/195

[58] Field of Search ............................ 546/278.4, 278.7, 546/290.7, 292; 8/467, 471

[56] References Cited

U.S. PATENT DOCUMENTS

| | | | |
|---|---|---|---|
| 5,128,312 | 7/1992 | Tanaka et al. ........................... | 503/227 |
| 5,132,438 | 7/1992 | Bach et al. ............................... | 552/295 |
| 5,216,169 | 6/1993 | Yamazaki ................................. | 546/292 |
| 5,225,548 | 7/1993 | Bach et al. ............................... | 544/105 |
| 5,310,942 | 5/1994 | Bach et al. ............................... | 544/105 |

FOREIGN PATENT DOCUMENTS

| | | | |
|---|---|---|---|
| 0 399 473 | 11/1990 | European Pat. Off. ................ | 534/856 |
| 0 443 045 | 8/1991 | European Pat. Off. ................ | 546/292 |
| 0 480 252 | 4/1992 | European Pat. Off. ................ | 546/292 |
| 0 480 281 | 4/1992 | European Pat. Off. ................ | 546/292 |
| 0 701 907 | 3/1996 | European Pat. Off. ................ | 546/292 |

*Primary Examiner*—Floyd D. Higel
*Attorney, Agent, or Firm*—Oblon, Spivak, McClelland, Maier & Neustadt, P.C.

[57] ABSTRACT

Methine dyes of the formula

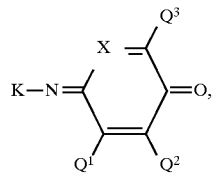

where

K is a 5- or 6-membered carbocyclic or heterocyclic radical,

X is nitrogen or a radical of formula C—$Q^1$, and $Q^1$, $Q^2$ and $Q^3$ are each independently of the others hydrogen, $C_1$–$C_6$-alkyl with or without interruption by 1 or 2 oxygen atoms in ether function, benzyl, $C_3$–$C_8$-cycloalkyl, substituted or unsubstituted phenyl, $C_1$–$C_4$-fluoroalkyl, $C_1$–$C_6$-alkoxy, benzyloxy, substituted or unsubstituted phenoxy, $C_1$–$C_6$-alkylthio, halogen, cyano, formylamino or a radical of the formula $R^3$, —$COR^1$, —CO—$NHR^1$, —CO—NH—CO—$R^1$, —CO—NH—CO—$R^4$, —CO—NH—$SO_2R^4$, —NH—CO—$R^1$, —NH—CO—$OR^1$, —NH—CO—$NR^1R^2$, —NH—$CSOR^1$, —NH—CS—$NR^1R^2$, —NH—CO—$R^4$, —NH—$SO_2$—$R^1$, —NH—$SO_2$—$R^4$ or —NH—$SO_2$—$NR^1R^2$, where $R^1$ and $R^2$ are each independently of the other $C_1$–$C_{13}$-alkyl with or without substitution, $C_3$–$C_8$-cycloalkyl or substituted or unsubstituted phenyl, or else —$NR^1R^2$ is amino, $R^3$ is a nonaromatic heterocyclic radical and $R^4$ is a heterocyclic radical or $Q^1$ and $Q^2$ are together with the carbon atoms to which they are attached a carbocyclic or heterocyclic ring, with the proviso that at least one of $Q^1$, $Q^2$ and $Q^3$ is $R^3$, are useful in thermal transfer.

10 Claims, No Drawings

METHINE DYES CONTAINING A 5- OR 6-MEMBERED CARBOCYCLIC OR HETEROCYCLIC RADICAL

The present invention relates to novel methine dyes of the formula I $$\text{K}-\text{N}=\begin{array}{c}\text{X}\\\phantom{X}\\\text{Q}^1\end{array}\begin{array}{c}\text{Q}^3\\\phantom{X}\\\text{Q}^2\end{array}=\text{O},\quad (I)$$

where
- K is a 5- or 6-membered carbocyclic or heterocyclic radical,
- X is nitrogen or a radical of formula C—$Q^1$, and
- $Q^1$, $Q^2$ and $Q^3$ are each independently of the others hydrogen, $C_1$–$C_6$-alkyl with or without interruption by 1 or 2 oxygen atoms in ether function, benzyl, $C_3$–$C_8$-cycloalkyl, substituted or unsubstituted phenyl, $C_1$–$C_4$-fluoroalkyl, $C_1$–$C_6$-alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^1$, —CO—NH—CO—$R^4$, —CO—NH—$SO_2R^4$, —NH—CO—$R^1$, —NH—$COOR^1$, —NH—CO—$NR^1R^2$, —NH—CS—$OR^1$, —NH—CS—$NR^1R^2$, —NH—CO—$R^4$, —NH—$SO_2$—$R^1$, —NH—$SO_2$—$R^4$ or —NH—$SO_2$—$NR^1R^2$, where $R^1$ and $R^2$ are each independently of the other $C_1$–$C_{13}$-alkyl with or without substitution and with or without interruption by from 1 to 3 oxygen atoms in ether function, $C_3$–$C_8$-cycloalkyl or substituted or unsubstituted phenyl, or else —$NR^1R^2$ is amino, $R^3$ is a 5- or 6-membered nonaromatic heterocyclic radical which may be benzofused and has one or more hetero atoms selected from the group consisting of nitrogen, oxygen and sulfur, and $R^4$ is a 5- or 6-membered heterocyclic radical which may be benzofused and has one or more hetero atoms selected from the group consisting of nitrogen, oxygen and sulfur, or $Q^1$ and $Q^2$ are together with the carbon atoms to which they are attached a 5- or 6-membered carbocyclic or heterocyclic ring, with the proviso that at least one of $Q^1$, $Q^2$ and $Q^3$ is $R^3$, and to a process for their thermal transfer.

U.S. Pat. No. 5,225,548 discloses the thermal transfer of indophenol dyes. However, it has been found that the dyes used there still have application defects.

It is an object of the present invention to provide novel azamethine dyes which shall be advantageous for non-impact printing processes, for example for thermal transfer, showing in that use particular high thermal stability, high lightfastness, high color strength and high brilliance. The novel dyes shall also be advantageous for dyeing or printing textile materials.

We have found that this object is achieved by the methine dyes of the formula I defined at the beginning.

K is a 5- or 6-membered carbocyclic or heterocyclic, preferably aromatic, radical which may be substituted and may be benzofused.

K can be derived for example from components of the benzene, indole, quinoline, aminonaphthalene, pyrrole, aminothiazole, benzimidazole, benzothiazole, aminothiophene or diaminopyridine series.

Important radicals K are for example those of the formulae IIa to IIj (IIa) (IIb) (IIc) (IId) (IIe) (IIf) (IIg) (IIh) (IIi)

or

-continued

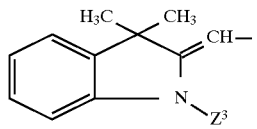

(IIj)

where n is 0 or 1, $Z^1$ is hydrogen, $C_1$–$C_6$-alkyl with or without interruption by 1 or 2 oxygen atoms in ether function, hydroxyl, $C_1$–$C_6$-alkoxy, $C_1$–$C_6$-alkylsulfonylamino, mono- or di($C_1$–$C_6$-alkyl)aminosulfonylamino or the radical —NHCO$Z^7$ or —NHCO$_2Z^7$, where $Z^7$ is phenyl, benzyl, tolyl or $C_1$–$C_6$-alkyl with or without interruption by an oxygen atom in ether function, $Z^2$ is hydrogen, halogen, $C_1$–$C_6$-alkyl or $C_1$–$C_6$-alkoxy, $Z^3$ and $Z^4$ are each independently of the other hydrogen, $C_1$–$C_{13}$-alkyl with or without substitution and with or without interruption by from 1 to 3 oxygen atoms in ether function, $C_3$–$C_4$-alkenyl, $C_3$–$C_8$-cycloalkyl, phenyl, tolyl or thienyl or are together with the nitrogen atom joining them together a 5- or 6-membered saturated heterocyclic radical with or without further hetero atoms, $Z^5$ is hydrogen or $C_1$–$C_6$-alkyl, and $Z^6$ is hydrogen, halogen, $C_1$–$C_6$-alkyl, substituted or unsubstituted phenyl, substituted or unsubstituted benzyl, $C_3$–$C_8$-cycloalkyl, thienyl, hydroxyl, $C_1$–$C_6$-alkoxy, $C_1$–$C_6$-alkylthio or $C_1$–$C_6$-monoalkylamino.

Any alkyl or alkenyl appearing in the abovementioned formulae may be straight-chain or branched.

Any substituted alkyl appearing in the abovementioned formulae may have as substituents for example, unless otherwise mentioned, cyclohexyl, substituted or unsubstituted phenyl, $C_1$–$C_8$-alkanoyloxy, $C_1$–$C_8$-alkylaminocarbonyloxy, $C_1$–$C_8$-alkoxycarbonyl, $C_1$–$C_8$-alkoxycarbonyloxy, the alkyl chain of the three last-mentioned radicals being optionally interrupted by from 1 to 3 oxygen atoms in ether function and phenyl- or phenoxy-substituted, cyclo-hexyloxy, phenoxy, halogen, hydroxyl, carboxyl or cyano. The number of substituents in substituted alkyl is generally 1 or 2.

Any interrupted alkyl appearing in the abovementioned formulae is preferably interrupted by 1 or 2 oxygen atoms in ether function.

Any substituted phenyl appearing in the abovementioned formulae may have as substituents for example $C_1$–$C_8$-alkyl, $C_1$–$C_8$-alkoxy, halogen, in particular chlorine or bromine, nitro or carboxyl. The number of substituents in substituted phenyl is generally from 1 to 3.

$Q^1$, $Q^2$, $Q^3$, $R^1$, $R^2$, $Z^1$, $Z^2$, $Z^3$, $Z^4$, $Z^5$, $Z^6$ and $Z^7$ are each for example methyl, ethyl, propyl, isopropyl, butyl, isobutyl, sec-butyl, tert-butyl, pentyl, isopentyl, neopentyl, tert-pentyl, hexyl or 2-methylpentyl.

$R^1$, $R^2$, $Z^3$ and $Z^4$ may each also be for example heptyl, octyl, 2-ethylhexyl, isooctyl, nonyl, isononyl, decyl, isodecyl, undecyl, dodecyl, tridecyl or isotridecyl. [The designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285).]

$Q^1$, $Q^2$, $Q^3$, $R^1$, $R^2$, $Z^1$, $Z^3$, $Z^4$ and $Z^7$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 4-methoxybutyl, 2- or 4-ethoxybutyl, 3,6-dioxaheptyl, 3,6-dioxaoctyl, 3,7-dioxaoctyl or 4,7-dioxaoctyl.

$R^1$, $R^2$, $Z^3$ and $Z^4$ may each also be for example 2- or 3-butoxypropyl, 2- or 4-butoxybutyl, 4,8-dioxanonyl, 3,7-dioxanonyl, 4,7-dioxanonyl, 4,8-dioxadecyl, 3,6,9-trioxadecyl or 3,6,9-trioxaundecyl.

$Q^1$, $Q^2$, $Q^3$, $Z^1$, $Z^2$ and $Z^6$ may each also be for example methoxy, ethoxy, propoxy, isopropoxy, butoxy, isobutoxy, sec-butoxy, pentyl, isopentyloxy, neopentyloxy or hexyloxy.

$Q^1$, $Q^2$, $Q^3$, $R^1$, $R^2$ and $Z^6$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,6-dichlorophenyl, 2-, 3- or 4-nitrophenyl or 2-, 3- or 4-carboxylphenyl.

$Q^1$, $Q^2$, $Q^3$, $Z^3$, $Z^4$ and $Z^6$ may each also be for example cyclopropyl, cyclobutyl, cyclopentyl, cyclohexyl, cycloheptyl or cyclooctyl.

$R^1$, $R^2$, $Z^3$ and $Z^4$ may each also be for example cyclohexylmethyl, 1- or 2-cyclohexylethyl, carboxylmethyl, 2-carboxylethyl, 2- or 3-carboxylpropyl, trifluoromethyl, 2-chloroethyl, 2-cyclohexyloxyethyl, phenoxymethyl, 2-phenoxyethyl, 2- or 3-phenoxypropyl, benzyl, 2-methylbenzyl, 1- or 2-phenylethyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, 2-methylaminocarbonyloxyethyl or 2-ethylaminocarbonyloxyethyl.

$Q^1$, $Q^2$, $Q^3$, $Z^2$ and $Z^6$ may each also be for example fluorine, chlorine or bromine.

$Q^1$, $Q^2$, $Q^3$ and $Z^6$ may each also be for example fluoromethyl, difluoromethyl, trifluoromethyl, 1,1,1-trifluoroethyl, pentylfluoroethyl, bis(trifluoromethyl)methyl, heptafluoropropyl, nonafluorobutyl, methylthio, ethylthio, propylthio, isopropylthio, butylthio, isobutylthio, sec-butylthio, pentylthio, isopentylthio, neopentylthio, tert-pentylthio or hexylthio.

$Q^1$, $Q^2$ and $Q^3$ may each also be for example phenoxy, 2-, 3- or 4-methylphenoxy, 2-, 3- or 4-methoxyphenoxy or 2-, 3- or 4-chlorophenoxy.

$Z^1$ is for example methylsulfonylamino, ethylsulfonylamino, propylsulfonylamino, isopropylsulfonylamino, butylsulfonylamino, pentylsulfonylamino, hexylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino, mono- or dipentylaminosulfonylamino, mono- or dihexylaminosulfonylamino or (N-methyl-N-ethylaminosulfonyl)amino.

$Z^6$ may also be for example benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino or hexylamino.

$Z^3$ and $Z^4$ may each also be for example allyl or methallyl.

$Z^3$ and $Z^4$ combined with the nitrogen atom joining them together into a 5- or 6-membered saturated heterocyclic radical with or without further hetero atoms can be for example pyrrolidinyl, piperidinyl, morpholinyl, piperazinyl or N-($C_1$–$C_4$-alkyl)piperazinyl.

$Q^1$ and $Q^2$ combined with the carbon atoms to which they are attached into a 5- or 6-membered carbocyclic or heterocyclic ring can be for example the pyrrole, benzene or pyridine ring. These rings may also be substituted and/or saturated.

$R^3$ is derived from a 5- or 6-membered nonaromatic heterocyclic radical which may be benzofused and which has one or more hetero atoms selected from the group consisting of nitrogen, oxygen and sulfur.

Suitable heterocyclic species which can carry substituents from which the radicals $R^3$ are derived are for example pyrrolidine, pyrroline, tetrahydrofuran, tetrahydrothiophene, pyrazolidine, pyrazoline, imidazolidine, imidazoline, indoline, isoindoline, piperidine, morpholine, thiomorpholine, piperazine, tetrahydroquinoline or tetrahydroisoquinoline.

Attention is drawn in particular to 5-membered nonaromatic heterocyclic radicals which may be benzofused, have 1 or 2 nitrogen atoms and are bonded via a nitrogen atom, in particular those of the pyrrolidine, pyrroline or isoindoline series.

$R^3$ has in particular the formula

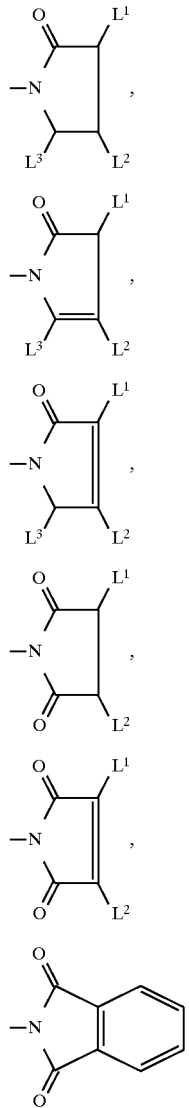

where $L^1$, $L^2$ and $L^3$ are each independently of the others hydrogen or $C_1$–$C_4$-alkyl.

Of particular importance are radicals of the formula IIIa, IIIe or IIIf where $L^1$, $L^2$ and $L^3$ are each hydrogen.

The radical of the formula IIIa where $L^1$, $L^2$ and $L^3$ are each hydrogen is of particular industrial interest.

$R^4$ can be for example a radical as described under $R^3$.

The radicals $R^4$ are preferably derived from a 5- or 6-membered aromatic heterocyclic radical which may be benzofused and which has one or more hetero atoms selected from the group consisting of nitrogen, oxygen and sulfur.

Suitable heterocyclic species which can carry substituents from which the radicals $R^4$ are derived are for example pyrrole, furan, thiophene, pyrazole, imidazole, oxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine or pyrazine.

Of these, attention must be drawn in particular to heterocycles of the pyrrole, thiophene, isoxazole, pyridine or pyridazine series.

$R^4$—CO or $R^4$—$SO_2$ radicals include in particular those 5- or 6-membered aromatic heterocyclic radicals which are derived from the following heterocyclic carboxylic acids $R^4$—COOH or sulfonic acids $R^4$—$SO_3$H:

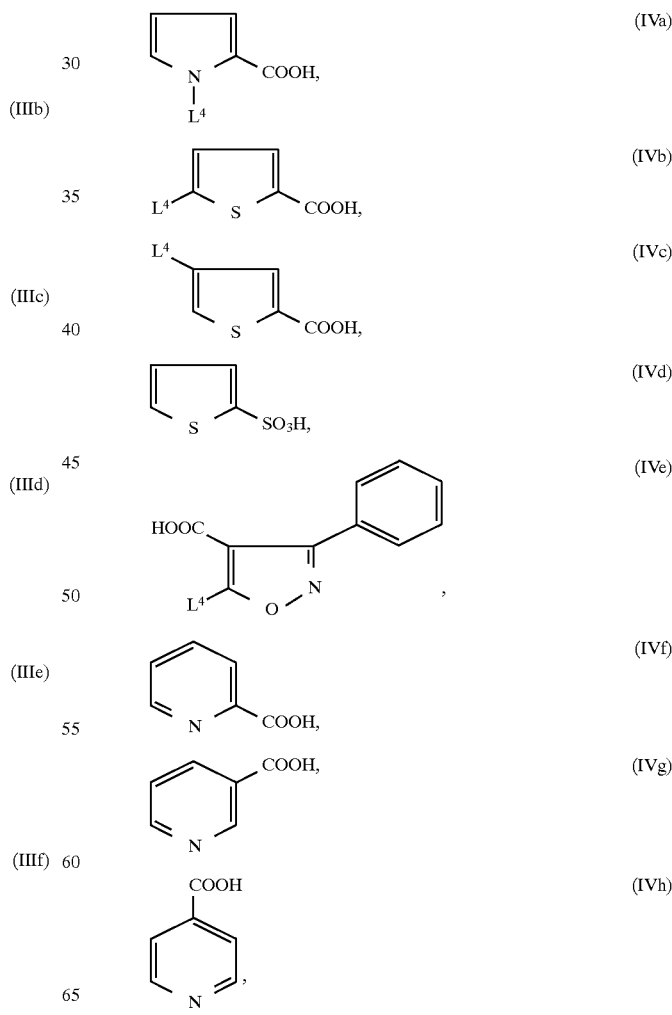

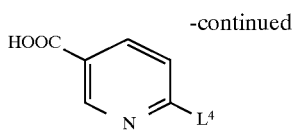 (IVi)

or

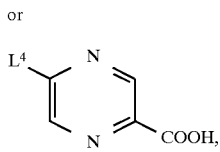 (IVj)

where L⁴ is in each case $C_1$–$C_4$-alkyl.

Preference is given to methine dyes of the formula I where $Q^1$, $Q^2$ and $Q^3$ are each independently of the others hydrogen, halogen, $C_1$–$C_4$-alkyl, $C_1$–$C_4$-alkoxy, formylamino or a radical of the formula $R^3$, —NH—CO—$R^1$ or —NH—CO—$OR^1$, where $R^1$ and $R^3$ are each as defined above.

Preference is further given to methine dyes of the formula I where K is a radical of the formula IIa, IIc or IIi, the radical of the formula IIa being particularly suitable.

Preference is further given to methine dyes of the formula I where one of $Q^2$ and $Q^3$ is $R^3$ and $Q^1$ is different from $R^3$.

Particular preference is given to methine dyes of the formula I where $Q^1$ is hydrogen, $C_1$–$C_4$-alkyl, halogen or a radical of formula —NH—CO—$R^1$ where $R^1$ is $C_1$–$C_6$-alkyl with or without phenyl, halogen or hydroxyl substitution or cyclohexyl and $Q^2$ and $Q^3$ are independently of each other hydrogen, $C_1$–$C_4$-alkyl, formylamino or a radical of the formula $R^3$ or —NH—CO—$R^1$ where $R^1$ is $C_1$–$C_6$-alkyl or tolyl and $R^3$ is as defined above.

Very particular preference is given to methine dyes of the formula Ia

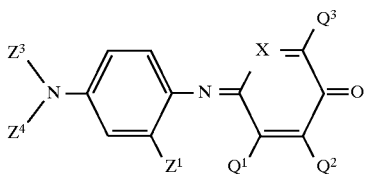 (Ia)

where

X is nitrogen or a radical of formula C—$Q^1$, in particular nitrogen, $Z^1$ is hydrogen, $C_1$–$C_4$-alkyl or $C_2$–$C_5$-alkanoylamino, $Z^3$ and $Z^4$ are independently of each other $C_1$–$C_6$-alkyl with or without hydroxyl substitution, benzyl, cyclohexyl, phenyl or tolyl, $Q^1$ is hydrogen, $C_1$–$C_4$-alkyl, $C_1$–$C_4$-alkoxy or a radical of the formula —NH—CO—$R^1$, and $Q^2$ and $Q^3$ are independently of each other hydrogen, $C_1$–$C_4$-alkyl, $C_1$–$C_4$-alkoxy, formylamino or a radical of the formula $R^3$, —NH—CO—$R^1$ or —NH—CO—$OR^1$ where $R^1$ is in each case $C_1$–$C_6$-alkyl with or without hydroxyl substitution, benzyl, cyclohexyl, phenyl or tolyl and $R^3$ is as defined above, with the proviso that at least one of $Q^2$ and $Q^3$ is $R^3$.

Of particular interest are methine dyes of the formula Ia where $Z^1$ is hydrogen, methyl, ethyl or $C_2$–$C_5$-alkanoylamino, $Z^3$ and $Z^4$ are independently of each other $C_1$–$C_6$-alkyl or benzyl, $Q^1$ is hydrogen, $C_1$–$C_4$-alkyl or $C_2$–$C_5$-alkanoylamino, and $Q^2$ and $Q^3$ are independently of each other hydrogen, $C_1$–$C_4$-alkyl, $C_1$–$C_5$-alkanoylamino, benzoylamino, methylbenzoylamino or a radical of the formula $R^3$.

Also of particular interest are methine dyes of the formula I where $Q^3$ is a 5- or 6-membered nonaromatic heterocyclic radical which may be benzofused and has one or more hetero atoms selected from the group consisting of nitrogen, oxygen and sulfur.

Preference is also given to methine dyes of the formula I in which the substituents are selected from a combination of the above-recited preferred substituents.

The methine dyes of the formula I can be obtained for example by the methods mentioned in U.S. Pat. No. 5,225,548 or U.S. Pat. No. 5,310,942.

For example, a nitroso compound of the formula V

$$K-N=O \qquad (V),$$

where K is as defined above, can be condensed with a hydroxy-aromatic of the formula VI

 (VI)

where $Q^1$, $Q^2$, $Q^3$ and X are each as defined above.

It is also possible to couple amines of the formula VII

$$K-NH_2 \qquad (VII),$$

where K is in each case as defined above, oxidatively with the hydroxyaromatics of the formula VI.

The present invention further provides a process for transferring dyes from a transfer to a plastic-coated paper by diffusion or sublimation with the aid of an energy source, which comprises using a transfer on which there is or are one or more methine dyes of the formula I.

To prepare the transfers required for the process of the present invention, the methine dyes of the formula I are incorporated in a suitable organic solvent or in mixtures of solvents together with one or more binders, optionally with the addition of auxiliaries, to form a printing ink. This printing ink preferably contains the dyes in a molecularly dispersed, ie. dissolved, form. The printing ink can be applied by means of a doctor blade to an inert support and air dried. Suitable organic solvents for the dyes are for example those in which the solubility of the dyes at 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert supports so that they will not rub off. Preference is given to those binders which, after the printing ink has dried, hold the dyes in the form of a clear, transparent film in which no visible crystallization of the dyes occurs.

Such binders are mentioned for example in U.S. Pat. No. 5,132,438 or in the pertinent patent applications cited therein. Also suitable are saturated linear polyesters.

Preferred binders are ethylcellulose, ethylhydroxyethylcellulose, polyvinylbutyral, polyvinyl acetate, cellulose propionate or saturated linear polyesters.

The weight ratio of binder: dye generally ranges from 1:1 to 10:1.

Suitable auxiliaries include for example release agents as mentioned in U.S. Pat. No. 5,132,438 or the pertinent patent applications cited therein. Other possibilities include in particular organic additives which prevent the crystallization of the transfer dyes in the course of storage or on heating of the ink ribbon, for example cholesterol or vanillin.

Suitable inert supports are described for example in U.S. Pat. No. 5,132,438 or in the pertinent patent applications cited therein. The thickness of the support is generally from 3 to 30 μm, preferably from 5 to 10 μm.

The dye receiver layer can in principle be any temperature-stable plastic layer with affinity for the dyes to be transferred, for example modified polycarbonates or polyesters. Further details can be found for example in U.S. Pat. No. 5,132,438 or the pertinent patent applications cited therein.

The transfer itself is effected by means of an energy source, for example by means of a laser or a thermal printing head, the latter having to be heatable to a temperature ≧300° C. in order that the dye transfer can take place within the time period t: 0<t<15 msec. The dye migrates out of the transfer sheet and diffuses into the surface coating of the receiving medium.

The methine dyes of the formula I used in the process of the present invention are notable for advantageous application properties. They are highly soluble in the ink ribbon (high compatibility with the binder), highly stable in the printing ink, readily transferable, possess high image stability (i.e. good lightfastness and also good stability to ambient effects, for example moisture, temperature or chemicals) and permit a flexible coloristic adaptation to given subtractive primary colors as part of an optimal trichromat. They are also notable for high brilliance due to the high transparence in the blue and green spectrum.

The dyes of the formula I according to the present invention are also advantageous for dyeing synthetic materials, for example polyesters, polyamides or polycarbonates of particular suitability are materials in textile form, such as fibers, yarns, threads, knitted fabric, woven fabric or nonwovens in polyester or polyamide or in polyester-cotton. The novel dyes of the formula I are also suitable for dyeing keratinous fibers, for example furs or hairs.

The novel dyes of the formula I are also advantageously suitable for manufacturing color filters as described for example in EP-A-399 473, or else can be used in the inkjet process.

Finally, they can also be used with advantage as colorants for producing toners for electrophotography.

The Examples which follow illustrate the invention.

A) PREPARATION

EXAMPLE 1 a) 220 g (2 mol) of 2-amino-3-hydroxypyridine were suspended in 2.5 l of toluene and admixed with a solution of 282 g (2 mol) of 4-chlorobutyryl chloride in 400 ml of toluene. The mixture was refluxed for 5 h. The residue which precipitated on cooling was filtered off with suction and recrystallized from chloroform/methanol to give 200 g of colorless crystals of the formula

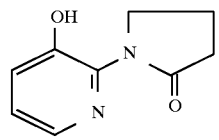

mp.: 144° C.

b) 21.4 g (0.1 mol) of 2-methyl-4-diethylaminoaniline hydrochloride were admixed with 400 ml of 10% strength by weight sodium carbonate solution, followed by 17.8 g of the compound described under a). Then at from 0° to 10° C. a solution of 45.6 g (0.2 mol) of ammonium peroxodisulfate in 200 ml of water was added dropwise. The reaction mixture was further stirred at room temperature for 1 h, and the precipitated dye was filtered off with suction and recrystallized from ethyl acetate to give 6 g of dark blue crystals of the formula

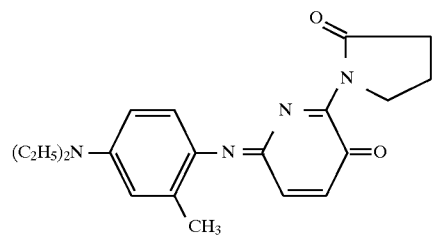

m.p.: 151° C.; λmax (in $CH_2Cl_2$): 647 nm

The same method gave the dyes of Table 1 below. The table contains inter alia not only the absorption maximum (measured in methylene chloride=a; tetrahydrofuran=b) but also the $R_f$ value on silica gel and the eluent used in the chromatography (3:2 v/v toluene/ethyl acetate=c; ethyl acetate=d)

TABLE 1

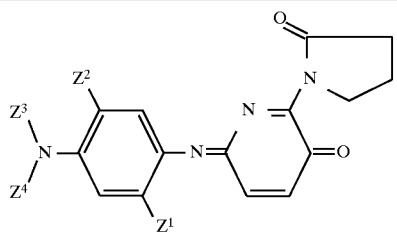

| Ex. No. | $Z^1$ | $Z^2$ | $NZ^3Z^4$ | mp. [°C.] | λmax [nm] | $R_f$ |
|---|---|---|---|---|---|---|
| 2 | $NHCOC(CH_3)_3$ | H | $N(C_2H_5)_2$ | 145 | 657 a) | |
| 3 | $NHCOCH_2C(CH_3)_3$ | H | $N(C_2H_5)_2$ | 155 | 657 a) | |
| 4 | $NHCOCH_3$ | H | $N(C_2H_5)_2$ | 151 | | |
| 5 | $NHCOC(CH_3)_3$ | H | $N(C_4H_9)_2$ | 152 | | |
| 6 | $NHCOCH(CH_3)_2$ | H | $N(C_2H_5)_2$ | | 660 a) | |

TABLE 1-continued

[Structure: benzene ring with Z³Z⁴N- and -Z² substituents on one side, and =N- linked to a pyridone ring bearing a 2-oxopyrrolidin-1-yl group and =O; Z¹ substituent on benzene]

| Ex. No. | Z¹ | Z² | NZ³Z⁴ | mp. [°C.] | λmax [nm] | R_f |
|---|---|---|---|---|---|---|
| 7 | NHCOC₂H₅ | H | N(C₂H₅)₂ | | 661 a) | |
| 8 | CH₃ | H | N(C₂H₅)(C₄H₉) | | 632 b) | 0.69 c) |
| 9 | H | H | N(C₄H₉)₂ | | 617 b) | 0.35 c) |
| 10 | CH₃ | H | N(C₂H₅)(CH(CH₃)₂) | | 629 b) | 0.59 c) |
| 11 | CH₃ | H | N(C₂H₅)(C₂H₄CH(CH₃)₂) | | 630 b) | 0.49 c) |
| 12 | NHCOCH₂OCH₃ | H | N(C₄H₉)₂ | | 641 b) | 0.22 c) |
| 13 | CH₃ | H | N(C₂H₅)(C₂H₄OH) | | 615 b) | 0.65 d) |
| 14 | OCH(C₂H₅)(CH₃) | H | N(C₂H₅)₂ | | 628 b) | 0.23 c) |
| 15 | CH₃ | H | N(C₂H₅)(CH₂C₆H₅) | | 619 b) | |

B) USE IN THERMAL TRANSFER

General Method a) 10 g of dye are stirred into 100 g of a 10% strength by weight solution of a binder in 4.5:2:2 v/v/v methyl ethyl ketone/toluene/cyclohexanone with or without brief heating to 80°–90° C.

The mixture is applied with a 6 μm doctor to a 6 μm thick polyester film, the back of which is coated with a suitable slipping layer, and dried with a hair dryer for 1 minute. Before the ink ribbon can be printed, it has to air-dry for at least 24 hours, since residual solvent can impair the printing process.

b) The ink ribbons are printed on a computer-controlled experimental setup equipped with a commercial thermal printing head onto commercially available video print paper.

Variation of the voltage is used to control the energy emitted by the thermal printing head, the pulse duration setting being 7 ms and only one pulse being emitted at a time. The energy emitted ranges from 0.5 to 2.0 mJ/dot.

Since the degree of coloring is directly proportional to the supplied energy it is possible to produce a color wedge for spectroscopic analysis.

The graph of the depth of color against the energy supplied per heating element is used to determine the Q* value (=energy in mJ for an absorbance of 1) and the gradient m in 1/mJ.

The results obtained are listed below in Table 2. The binder used was based on polyvinyl butyral and the receiving medium used was color video print paper from Hitachi.

TABLE 2

| Dye No. | Q* [mJ/dot] | m [1/mJ] |
|---|---|---|
| 1 | 0.86 | 3.07 |
| 2 | 0.90 | 2.54 |
| 3 | 0.92 | 2.32 |

TABLE 2-continued

| Dye No. | $Q^*\left[\dfrac{mJ}{dot}\right]$ | $m\left[\dfrac{1}{mJ}\right]$ |
|---|---|---|
| 4 | 1.10 | 1.87 |
| 5 | 0.98 | 2.15 |
| 6 | 0.95 | 2.48 |
| 7 | 0.91 | 2.90 |

We claim:

1. A methine dye of the formula I:

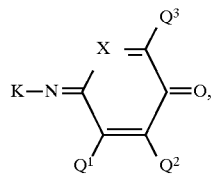
(I)

where

K is a 5- or 6-membered carbocyclic or heterocyclic radical,

X is nitrogen or a radical of formula C—$Q^1$, and $Q^1$, $Q^2$ and $Q^3$ are each, independently, hydrogen, $C_1$–$C_6$-alkyl with or without interruption by 1 or 2 ether oxygen atoms, benzyl, $C_3$–$C_8$-cycloalkyl, substituted or unsubstituted phenyl, $C_1$–$C_4$-fluoroalkyl, $C_1$–$C_6$-alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^4$, —CO—NH—$SO_2R^4$, —NH—CO—$R^1$, —NH—CO—$OR^1$, —NH—CO—$NR^1R^2$, —NH—CS—$OR^1$, —NH—CS—$NR^1R^2$, —NH—CO—$R^4$, —NH—$SO_2$—$R^1$, —NH—$SO_2$—$R^4$ or —NH—$SO_2$—$NR^1R^2$, where $R^1$ and $R^2$ are each, independently, $C_1$–$C_3$-alkyl with or without substitution and with or without interruption by from 1 to 3 ether oxygen atoms, $C_3$–$C_8$-cycloalkyl or substituted or unsubstituted phenyl, or else —$NR^1R^2$ is amino, $R^3$ is

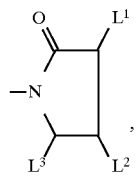
(IIIa)

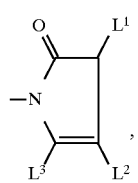
(IIIb)

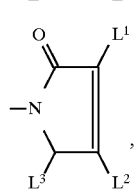
(IIIc)

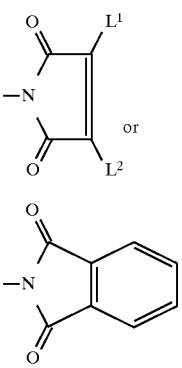
(IIIe)

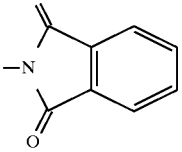
(IIIf)

where $L^1$, $L^2$ and $L^3$ are each, independently, hydrogen or $C_1$–$C_4$-alkyl, and $R^4$ is a 5- or 6-membered heterocyclic radical which is or is not benzofused and has one or more hetero atoms selected from the group consisting of nitrogen, oxygen and sulfur, or $Q^1$ and $Q^2$ are together with the carbon atoms to which they are attached a 5- or 6-membered carbocyclic or heterocyclic ring, with the proviso that at least one of $Q^1$, $Q^2$ and $Q^3$ is $R^3$.

2. The methine dye as claimed in claim 1 wherein K is a radical of the formula

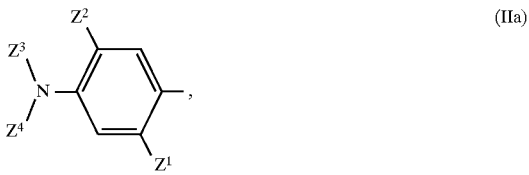
(IIa)

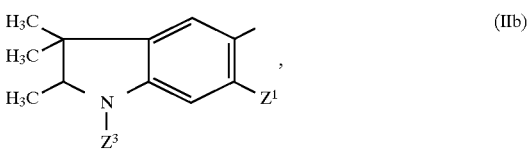
(IIb)

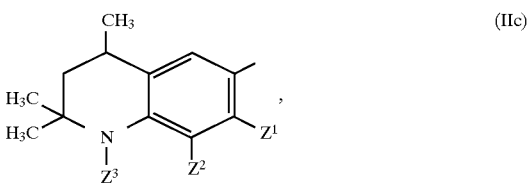
(IIc)

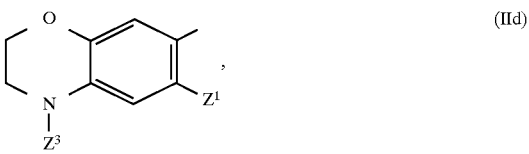
(IId)

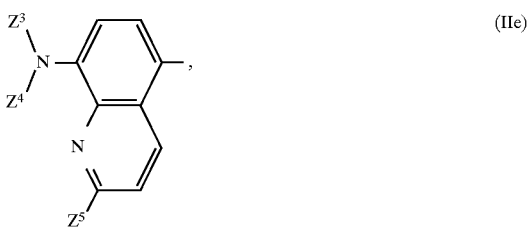
(IIe)

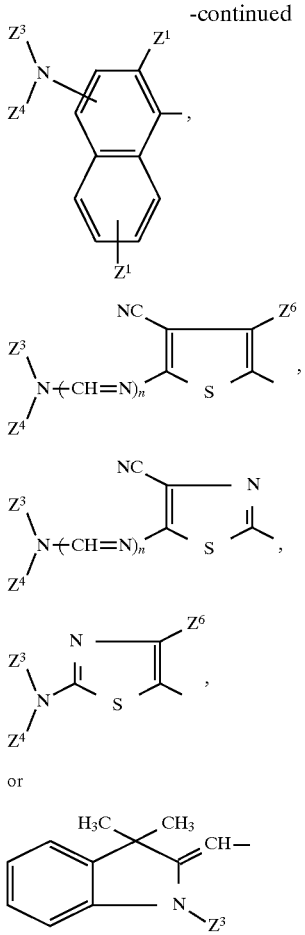

where
n is 0 or 1,
$Z^1$ is hydrogen, $C_1$–$C_6$-alkyl with or without interruption by 1 or 2 ether oxygen atoms, hydroxyl, $C_1$–$C_6$-alkoxy, $C_1$–$C_6$-alkylsulfonylamino, mono- or di($C_1$–$C_6$-alkyl)aminosulfonylamino or the radical —NHCOZ$^7$ or —NHCO$_2$Z$^7$, where Z$^7$ is phenyl, benzyl, tolyl, thienyl or $C_1$–$C_6$-alkyl with or without interruption by an ether oxygen atom,
$Z^2$ is hydrogen, halogen, $C_1$–$C_6$-alkyl or $C_1$–$C_6$-alkoxy,
$Z^3$ and $Z^4$ are each independently of the other hydrogen, $C_1$–$C_{13}$-alkyl with or without substitution and with or without interruption by from 1 to 3 ether oxygen atoms, $C_3$–$C_4$-alkenyl, $C_3$–$C_8$-cycloalkyl, phenyl or tolyl or are together with the nitrogen atom joining them together a 5- or 6-membered saturated heterocyclic radical with or without further hetero atoms,
$Z^5$ is hydrogen or $C_1$–$C_6$-alkyl, and
$Z^6$ is hydrogen, halogen, $C_1$–$C_6$-alkyl, substituted or unsubstituted phenyl, substituted or unsubstituted benzyl, $C_3$–$C_8$-cycloalkyl, thienyl, hydroxyl, $C_1$–$C_6$-alkoxy, $C_1$–$C_6$-alkylthio or $C_1$–$C_6$-monoalkylamino.

3. The methine dye as claimed in claim 1 or 2 wherein $Q^1$, $Q^2$ and $Q^3$ are each independently of the others hydrogen, halogen, $C_1$–$C_4$-alkyl, $C_1$–$C_4$-alkoxy, formylamino or a radical of the formula $R^3$, —NH—CO—$R^1$ or —NH—CO—OR$^1$.

4. The methine dye as claimed in claim 1 or 2 wherein K is a radical of the formula IIa, IIc or IIi.

5. The methine dye according to claim 1 or 2 wherein $Q^1$ is hydrogen, $C_1$–$C_4$-alkyl, halogen or a radical of formula —NH—CO—$R^1$ where $R^1$ is $C_1$–$C_6$-alkyl with or without phenyl, halogen or hydroxyl substitution or cyclohexyl and $Q^2$ and $Q^3$ are independently of each other hydrogen, $C_1$–$C_4$-alkyl, formylamino or a radical of the formula $R^3$ or —NH—CO—$R^1$ where $R^1$ is $C_1$–$C_6$-alkyl or tolyl.

6. The methine dye as claimed in claim 1 or 2 of the formula Ia

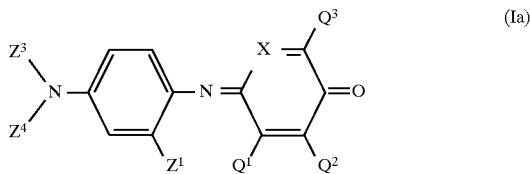

where
X is nitrogen or a radical of formula C—Q$^1$,
$Z^1$ is hydrogen, $C_1$–$C_4$-alkyl or $C_2$–$C_5$-alkanoylamino,
$Z^3$ and $Z^4$ are independently of each other $C_1$–$C_6$-alkyl with or without hydroxyl substitution, benzyl, cyclohexyl, phenyl or tolyl,
$Q^1$ is hydrogen, $C_1$–$C_4$-alkyl, $C_1$–$C_4$-alkoxy or a radical of the formula —NH—CO—$R^1$, and
$Q^2$ and $Q^3$ are independently of each other hydrogen, $C_1$–$C_4$-alkyl, $C_1$–$C_4$-alkoxy, formylamino or a radical of the formula $R^3$, —NH—CO—$R^1$ or —NH—CO—OR$^1$ where $R^1$ is in each case $C_1$–$C_6$-alkyl with or without hydroxyl substitution, benzyl, cyclohexyl, phenyl or tolyl,
with the proviso that at least one of $Q^2$ and $Q^3$ is $R^3$.

7. The methine dye as claimed in any of claim 1 or 2 wherein $Q^3$ is a 5- or 6-membered nonaromatic heterocyclic radical which is or is not benzofused and has one or more hetero atoms selected from the group consisting of nitrogen, oxygen and sulfur.

8. A process for transferring dyes from a transfer to a plastic-coated paper by diffusion or sublimation with the aid of an energy source, which comprises using a transfer on which there is or are one or more methine dyes as claimed in claim 1.

9. The dye of claim 1, having the formula:

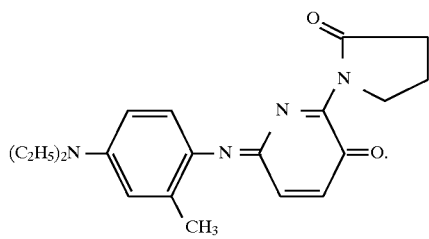

10. A methine dye of the formula I:

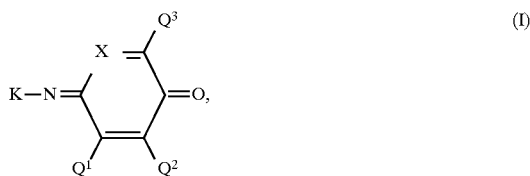

where
K is a 5- or 6-membered carbocyclic or heterocyclic radical,
X is nitrogen or a radical of formula C—Q$^1$, and
$Q^1$, $Q^2$ and $Q^3$ are each, independently, hydrogen, $C_1$–$C_6$-alkyl with or without interruption by 1 or 2 ether oxygen atoms, benzyl, $C_3$–$C_8$-cycloalkyl, substituted or unsubstituted phenyl, $C_1$–$C_4$-fluoroalkyl, $C_1$–$C_6$- alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^4$, —CO—NH—$SO_2R^4$, —NH—CO—$R^1$, —NH—CO—$OR^1$, —NH—CO—$NR^1R^2$, —NH—CS—$OR^1$, —NH—CS—$NR^1R^2$, —NH—CO—$R^4$, —NH—$SO_2$—$R^1$, —NH—$SO_2$—$R^4$ or —NH—$SO_2$—$NR^1R^2$, where $R^1$ and $R^2$ are each, independently, $C_1$–$C_{13}$-alkyl with or without substitution and with or without interruption by from 1 to 3 ether oxygen atoms, $C_3$–$C_8$-cycloalkyl or substituted or unsubstituted phenyl, or else —$NR^1R^2$ is amino, $R^3$ is

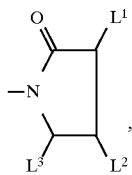 (IIIa)

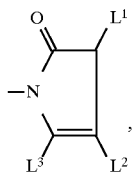 (IIIb)

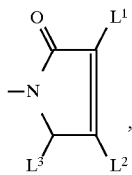 (IIIc)

 (IIIe)

 (IIIf)

where $L^1$, $L^2$ and $L^3$ are each, independently, hydrogen or $C_1$–$C_4$-alkyl, and $R^4$ is a 5- or 6-membered heterocyclic radical which is or is not benzofused and has one or more hetero atoms selected from the group consisting of nitrogen, oxygen and sulfur, or $Q^1$ and $Q^2$ are together with the carbon atoms to which they are attached a 5- or 6-membered carbocyclic or heterocyclic ring, with the proviso that at least one of $Q^1$, $Q^2$ and $Q^3$ is $R^3$, and wherein any two of $Q^1$, $Q^2$ and $Q^3$ are not simultaneously —$NHSO_2R^1$ and a group of formula IIIa, respectively.

* * * * *